D. DE VRIES.
LAND MARKER.
APPLICATION FILED AUG. 22, 1916.

1,237,178.

Patented Aug. 14, 1917.
2 SHEETS—SHEET 1.

Witness
P. M. Hunt.

Inventor
D. De Vries.
By John Louis Waters
Attorney

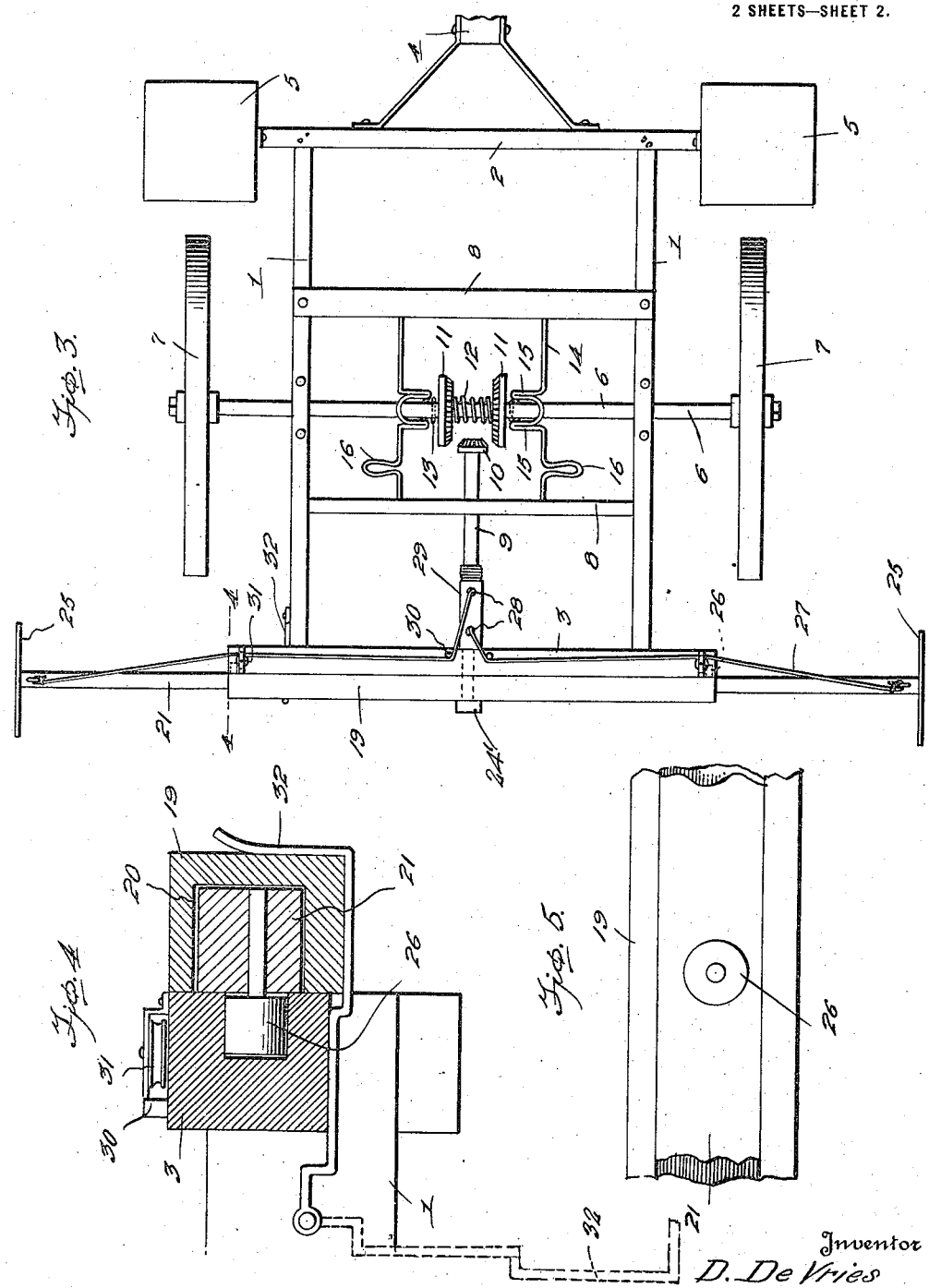

UNITED STATES PATENT OFFICE.

DIRK DE VRIES, OF CORONA, SOUTH DAKOTA, ASSIGNOR OF ONE-HALF TO WILLIAM WESTENFIELD, OF WASHINGTON, DISTRICT OF COLUMBIA.

LAND-MARKER.

1,237,178.  Specification of Letters Patent.  Patented Aug. 14, 1917.

Application filed August 22, 1916. Serial No. 116,280.

*To all whom it may concern:*

Be it known that I, DIRK DE VRIES, a citizen of the United States, residing at Corona, in the county of Roberts and State of South Dakota, have invented certain useful Improvements in Land-Markers, of which the following is a specification, reference being had therein to the accompanying drawing.

The object of my invention is to provide a marking attachment for a planter, which may be readily raised from or lowered to the ground, and which may be quickly shifted from one side of the planter to the other by mechanism driven from the ground wheels of the planter, and completely within the control of the operator.

A further object of my invention is to provide a marker of this type of few parts and of simple but durable construction, and therefore not liable to break or become inoperative from any cause.

With these and other objects in view, which will become apparent as the description proceeds, my invention resides in the construction, combination, and arrangement of parts to be hereinafter described and claimed, and illustrated in the accompanying drawings forming a part of this specification, and in which like reference characters indicate like parts throughout the several views.

Fig. 3 is a top plan view of a planter having my marker attached thereto.

Fig. 4 is an enlarged vertical section on the line 4—4 of Fig. 3.

Fig. 5 is an enlarged fragmentary front view of the marker arm and the frame carrying the same.

Figure 1:
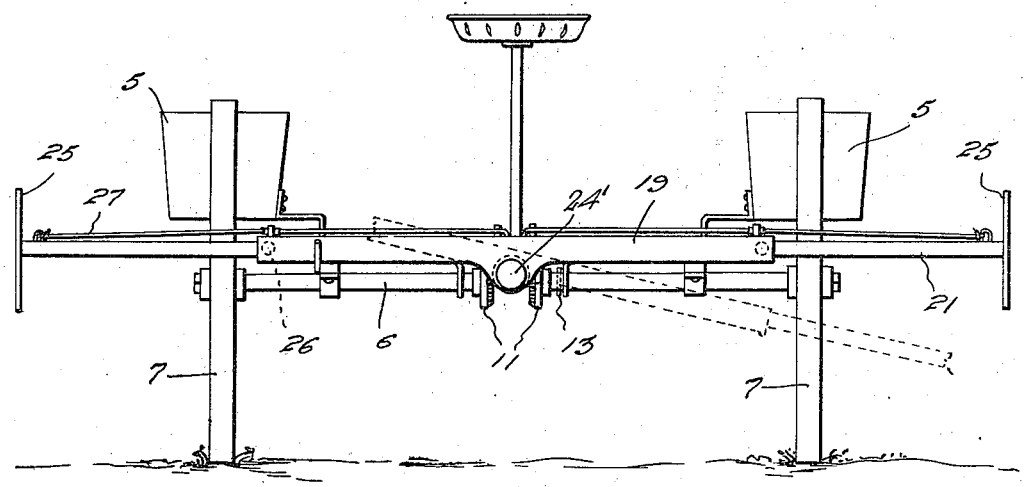
Figure 1 is a rear elevation of my marker applied to a planter and showing both the operative and inoperative position of the marker arm.

Referring to the drawings, a planter is shown having a rectangular frame consisting of side bars 1, front and rear cross pieces 2 and 3 respectively, cross braces 8, a tongue 4 attached to the front cross piece, seed boxes 5 at each side of the front of the machine, and an axle 6 extending transversely of the vehicle between the cross bars, and journaled in the side bars 1, and carrying standard ground wheels 7.

A shaft 9 extending longitudinally of the planter frame at the center thereof, is journaled in the rear cross piece 2 and one of the cross braces 8, and carries a bevel gear 10 on its inner end, which is adjacent the axle 6. The axle 6 has two inwardly facing spaced bevel gears 11 slidably keyed thereon at opposite sides of the bevel gear 10, and adapted to have one or the other brought into mesh with the bevel gear 10 as desired.

The bevel gears 11 are held normally spaced apart, and from the gear 10 by a coiled spring 12, the ends of which bear against the opposed faces of the gears, the outward movements of the latter upon the axle 6 being checked by suitable pins 13.

A rocking shaft 14 is mounted longitudinally of this planter frame between the cross braces 8 in rear of each of the bevel gears, and has a yoke formed therein having an arm 15 extending inwardly, and downwardly on each side of this axle 6, and adapted to abut against the rear of each of the bevel gears 11 to slide the same along the axle 6, and into engagement with the gear 10, when the shaft 14 is rocked. An outwardly extending foot pedal 16 is also formed in the shaft 14, by means of which the shaft 14 may be rocked.

The rear cross piece 3 of the planter frame has a bearing 17 formed in a downwardly projecting lug 18 on its lower surface, through which passes the outer end of the shaft 9. Upon the outer end of this shaft is pivotally secured a bar 19 of substantially the same length as the cross piece 3, and adapted to fit against the rear of the same. This bar 19 has a channel 20 extending the length of the same upon its inner face, through which the marker arm 21 is adapted to slide.

Figure 2:
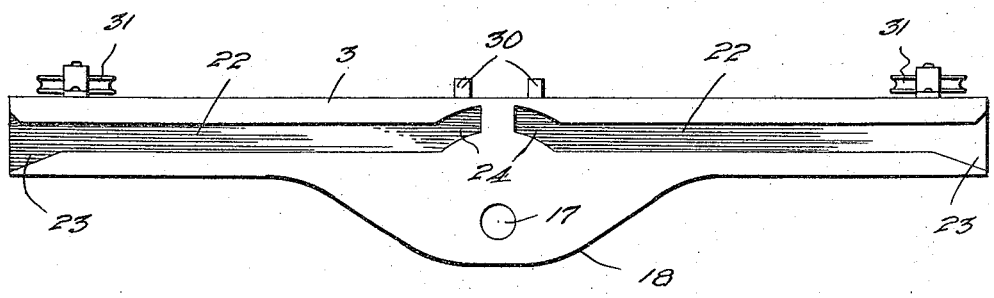
Fig. 2 is an enlarged rear elevation of the rear cross bar of the planter frame.

The rear cross bar 3 has channels or slots 22 formed in its face which is adjacent the bar 19, extending from each end of the same to points near the center of the bar, as shown in Fig. 2, and the outer ends of these slots are outwardly flared as shown at 23. The inner ends of the slots are upwardly curved as shown at 24. A head 24′ is carried by the outer end of the shaft 9 and serves to prevent the accidental displacement of the bar 19.

The marker arm 21 which slides in the channel 20, extends beyond the planter at each side thereof and carries a marking shoe 25 at each end. A rearwardly extending roller 26 adapted to slide in each of the slots 22 in the rear cross piece 3, is secured to the inner face of the marker arm at each side of the center thereof, in such a position that when the marker arm is in its central or inoperative position, the rollers 26 will engage the slots 22 near their outer ends.

The mechanism for shifting the marker arm 21 transversely of the planter consists of a cable 27 secured to, and having its central portion wound upon the shaft 9 in rear of the cross bar 3, and having its ends threaded through openings 28 in a suitable support 29, extending rearwardly of the central portion of the cross bar 3, and thence passing around pulleys 30 at each side of the center of the top of the cross piece 3, thence around pulleys 31 upon the outer ends of the cross bar 3, and thence to each end of the marker arm respectively, where they are secured.

A spring latch 32 is pivoted to the rear end of one of the side bars 1 of the planter, and is adapted to engage the marker arm supporting bar 19 and the rear cross bar 3 so as to prevent rotation of the former relative to the latter as clearly shown in Fig. 4.

In the operation of my invention, assuming that the machine is about to start a new row, under which condition the marker arm supporting bar will be held against the rear of the rear cross arm by latch 32, and the marker arm will be held in a horizontal position with its center at the center of the supporting bar, and the rollers 26 engaging in the slots 22 at each end of the cross bar 3, the operator in order to lower one of the marking shoes to the ground, will swing back the latch 32 and press upon one of the foot levers 16, thereby throwing one or the other of the bevel gears upon the axle 6 into engagement with the gear 10, thus rotating the shaft 9 in one direction or the other, and so winding in one end of the cable and paying out the other end. This will slide the marker arm within its support until one of the rollers 26 is free of the slot 22, and the other roller slides into the upwardly curved end of the other slot, thereby turning the marker arm supporting bar 19 upon the shaft 9, and so depressing one end of the marker arm until the marking shoe engages the soil, as shown in dotted lines in Fig. 1.

To return the marker arm to its horizontal or inoperative position, the shaft 9 is rotated in the opposite direction, pulling the marker arm in the opposite direction, and causing the inner roller to slide back into the straight portion of the slot 22, thereby swinging the bar 19 back to its horizontal position, and causing the outer roller to slide back into the slot 22, guided by the outwardly flaring mouth 23.

When the marker arm is again at its central position, the shaft 9 is disengaged from the axle 6, and the device secured by this latch 32, or if it is desired to lower the marking shoe upon the opposite end of the arm, the marking arm is pulled beyond its central position, in which case the above described operation is repeated upon the opposite side of the machine.

It will thus be seen from the foregoing description that I have provided a land marker for a planting machine which may be quickly swung to an operative position at either side of the planter, or may be held in an inoperative position centrally of the machine, thus occupying only a small amount of space when not in use; and that I have further provided a marking device which is shifted from one position to another by power taken from the axle of the planter, thereby reducing the labor incident to the operation of the machine.

I claim:

1. In a land marker, the combination with a frame having a rear cross member, of an axle having supporting wheels thereon, a shaft extending longitudinally of the frame, a reversible clutch between the said shaft and axle for rotating the said shaft in either direction, a bar pivoted upon this said shaft and abutting against the said rear cross member, the said bar having a channel extending the length of the same upon its face adjacent the said cross member, an arm having marking shoes upon its ends adapted to slide within the said channel, the said cross member having a slot with an upwardly curved inner end, extending from each end of the cross member to points adjacent the center of the same rollers upon the said marker arm adapted to engage each of the said slots near their outer ends, a cable secured to, and having its central portion wound upon the above mentioned shaft and having an end secured to each end of the marker arm, and a latch adapted to hold the said bar against rotation relative to the rear cross member.

2. In a land marker, the combination with a frame having a rear cross member, of a marker arm secured to the said cross member in such a manner that it may be slid transversely of the frame and have its outer end swung downwardly into engagement with the soil, the said cross member having a slot with an upwardly curved inner end, extending from each end of the cross member to points adjacent the center of the same, rollers upon the said marker arm adapted to engage each of the said slots near their outer ends, and means for sliding the said marker arm to one side or the other of the frame.

In testimony whereof I affix my signature.

DIRK DE VRIES.